C. SEEWALD.
TIRE ATTACHMENT.
APPLICATION FILED MAY 26, 1913.

1,109,307.

Patented Sept. 1, 1914.

Witnesses

C. Seewald,
Inventor
by
Attorneys

UNITED STATES PATENT OFFICE.

CHRISTIAN SEEWALD, OF WILLIAMSPORT, PENNSYLVANIA.

TIRE ATTACHMENT.

1,109,307. Specification of Letters Patent. Patented Sept. 1, 1914.

Application filed May 26, 1913. Serial No. 770,034.

*To all whom it may concern:*

Be it known that I, CHRISTIAN SEEWALD, a citizen of the United States, residing at Williamsport, in the county of Lycoming and State of Pennsylvania, have invented a new and useful Tire Attachment, of which the following is a specification.

The device forming the subject matter of this application is a shoe or traction cleat, adapted to be assembled with the rim and tire of a vehicle wheel, to enhance the action of the wheel, and to facilitate the removal of a vehicle, under the driving action of the wheel, from a rut or swale-hole.

One object of the invention is to provide a shoe of the type described, so constructed that the wheel will not be subjected to twisting strain.

Another object of the invention is to provide a shoe of the type described which will free itself readily from the mud.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
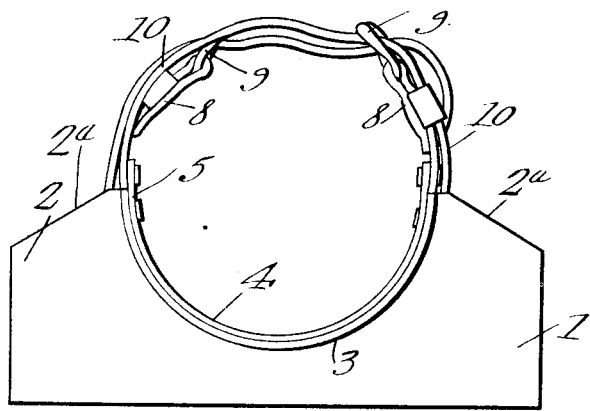
Figure 2:
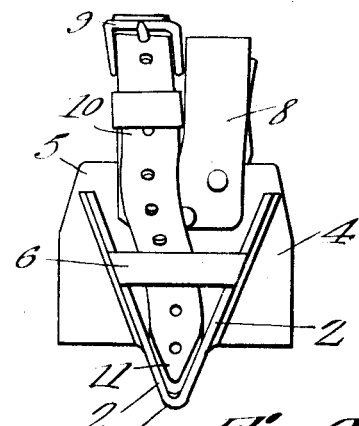
Figure 3:
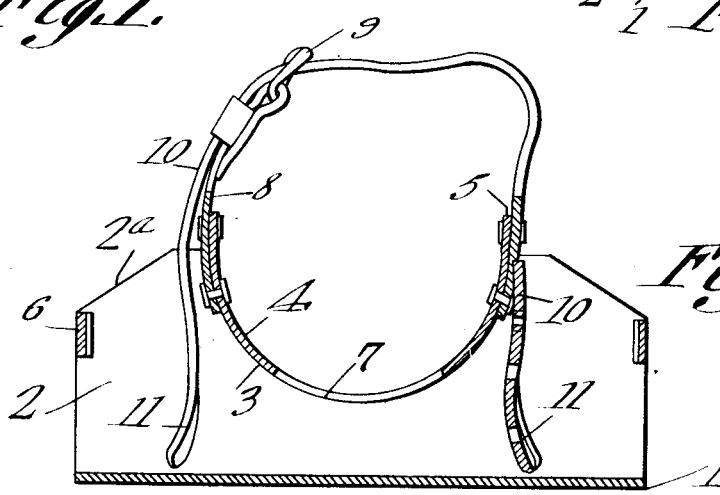
Figure 4:
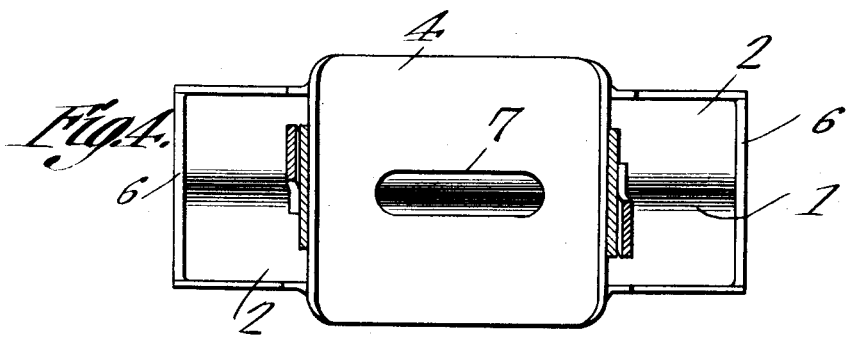

In the drawings: Figure 1 is a side elevation; Fig. 2 is an end elevation; Fig. 3 is a longitudinal section; Fig. 4 is a top plan, parts being sectioned.

The shoe or cleat herein disclosed comprises a trough-shaped tread 1, the side walls 2 of which diverge as they extend upwardly. The side walls are notched as indicated at 3, to receive a trough-shaped saddle 4, the saddle 4 being connected with the side walls 2 in any suitable manner. The ends of the saddle, indicated at 5, upstand above the side walls 2 of the tread 1, and the side walls 2 at their ends project beyond the saddle 4. The side walls 2 of the tread 1, upon their upper edges, may be beveled or inclined as indicated at 2ª, and reinforcing bars 6 connect the side walls 2. If desired, an opening indicated at 7 may be fashioned in the saddle 4, between the side walls 2. Secured to each end 5 of the saddle 4 is a stub strap 8, carrying a buckle 9, adapted to be assembled with a tie strap 10 connected with the other end 5 of the saddle, each end of the saddle carrying a tie strap and a stub strap, the tie straps of the respective ends of the saddle projecting in opposite directions, and the stub straps of the respective ends of the saddle projecting in opposite directions. It is to be noted that the tread 1 extends laterally upon both sides of the saddle 4. Consequently, when the wheel is rotated forcibly, the pressure of the soil against the tread is applied not only directly beneath the saddle 4, but upon both sides of the saddle as well. Consequently, no twisting action is imparted to the wheel, and a braking of the wheel is not likely to occur.

The reinforcing bars 6 serve to strengthen the tread 1. The ends 11 of the tire straps 10 lie inside of the reinforcing bars 6 and these bars serve to prevent the ends 11 of the tie straps from projecting beyond the ends of the tread 1. The ends 11 of the tie straps bear upon the side walls 2 of the tread and constitute closures, preventing the mud from being forced into the interior of the tread 1, to a point beneath the saddle 4. Owing to the fact that the saddle 4 is equipped with the opening 7 hereinbefore mentioned, air when the wheel is rotated, will pass between the periphery of the tire and the inner face of the saddle 4, it being recalled that since most tires are provided with anti-skidding projections of some sort, the tire will not effect a closure of the opening 7. There will, therefore, be no suction within the tread 1, due to the action of the mud when the wheel is revolved.

Having thus described the invention, what is claimed is:—

1. A device of the class described comprising a trough-shaped tread and a trough-shaped saddle inset into the walls of the tread, the saddle and the tread being dished in a common direction, the tread being terminally extended beyond the side walls of the saddle and being upwardly extended upon the side walls of the saddle, thereby to afford a reinforcement, the tread and the saddle being angularly disposed with respect to each other.

2. A device of the class described comprising a trough-shaped tread and a trough-shaped saddle inset into the walls of the tread, the saddle and the tread being dished in a common direction and being angularly disposed, the tread being open at its ends and the saddle having a vent opening for which the tread constitutes a shield.

3. A device of the class described comprising a trough-shaped tread; a trough-shaped saddle disposed transversely of the tread and assembled with the tread; and connecting straps carried by the saddle, the ends of the straps being wedged between the side walls of the tread, to constitute closures for the openings existing between the side walls of the tread.

In testimony that I claim the foregoing as my own, I have hereto affixed my signature in the presence of two witnesses.

CHRISTIAN SEEWALD.

Witnesses:
GEORGE TRUEMPE,
PHILIP ZEALN.

Copies of this patent may be obtained for five cents each, by addressing the "Commissioner of Patents, Washington, D. C."